United States Patent
Zucker

(10) Patent No.: US 7,277,363 B1
(45) Date of Patent: Oct. 2, 2007

(54) MAGNETO-OPTICAL RECORDING OR REPRODUCING DEVICE

(75) Inventor: Friedhelm Zucker, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/207,361

(22) Filed: Dec. 8, 1998

(30) Foreign Application Priority Data

Dec. 18, 1997 (DE) ................................ 197 56 458

(51) Int. Cl.
*G11B 11/00* (2006.01)
(52) U.S. Cl. ............................... 369/13.14; 369/13.04; 369/13.17; 369/13.03
(58) Field of Classification Search ................ 369/13, 369/116, 44.37, 48, 49, 44.34, 14, 100, 13.19, 369/13.17, 13.03, 30.23, 47.6, 84, 13.26, 369/13.07, 13.27, 13.39, 53.26, 53.37, 13.24, 369/13.46, 13.45, 13.14, 13.22, 13.04, 13.44; 365/122; 360/114; 709/223

See application file for complete search history.

(56) References Cited

U.S. PATENT DOCUMENTS

| | | | | |
|---|---|---|---|---|
| 4,712,203 A | * | 12/1987 | Saito et al. | 369/13 |
| 5,025,430 A | * | 6/1991 | Takokoro et al. | 369/13.46 |
| 5,172,364 A | * | 12/1992 | Yoshimoto et al. | 369/13 |
| 5,325,345 A | * | 6/1994 | Shimokawato et al. | 369/13.03 |
| 5,327,417 A | | 7/1994 | Tanaka et al. | 369/219 |
| 5,353,171 A | | 10/1994 | Suzuki et al. | 360/59 |
| 5,367,508 A | * | 11/1994 | Haba | 369/13.17 |
| 5,459,701 A | * | 10/1995 | Tokita et al. | 369/13 |
| 5,493,548 A | * | 2/1996 | Kamioka | 369/44.37 |
| 5,503,924 A | | 4/1996 | Osato | 428/336 |
| 5,530,685 A | * | 6/1996 | Katayama et al. | 369/13 |
| 5,535,180 A | * | 7/1996 | Shimamori et al. | 369/13 |
| 5,587,974 A | | 12/1996 | Nishimura | 369/13 |
| 5,602,806 A | * | 2/1997 | Arnett et al. | 369/13.24 |
| 5,796,688 A | * | 8/1998 | Gage et al. | 369/44.34 |
| 6,018,505 A | * | 1/2000 | Miyatake et al. | 369/13.2 |
| 6,212,136 B1 | * | 4/2001 | Maeda et al. | 369/13.19 |
| 6,256,286 B1 | * | 7/2001 | Ogawa | 369/116 |

FOREIGN PATENT DOCUMENTS

| | | |
|---|---|---|
| DE | 19507228 A1 | 9/1995 |
| DE | 19700378 A1 | 7/1997 |
| EP | 0391734 A2 | 10/1990 |
| EP | 0537952 A2 | 4/1993 |
| EP | 0657878 A2 | 6/1995 |

OTHER PUBLICATIONS

H. Bögeholz, *Guflügelte Daten*, c't 1995, pp. 112-116—Translation Attached.
German Search Report.
European Search Report citing the above-listed doumments AA, AB, AC, AM, AN, and AO.

* cited by examiner

*Primary Examiner*—Andrea Wellington
*Assistant Examiner*—Kim-Kwok Chu
(74) *Attorney, Agent, or Firm*—Joseph J. Laks; Robert D. Shedd; Paul P. Kiel

(57) ABSTRACT

A magneto-optical recording or reproducing device having an information erasing means for erasing information or data recorded on a magneto-optical recording medium. According to the invention, the information erasing means comprises an erasing magnet having a field strength sufficient to initialize the magneto-optical recording medium without the assistance of a laser and/or an optical scanning device.

8 Claims, 2 Drawing Sheets

MAGNETO-OPTICAL RECORDING OR REPRODUCING DEVICE

FIELD OF THE INVENTION

The invention relates to a magneto-optical recording or a magneto-optical reproducing device having an erasing facility for information recorded on a magneto-optical recording medium, it also being possible for such a recording or reproducing device to be used, for example, for the continuous magneto-optical recording, buffering and reproduction of video and/or audio signals.

BACKGROUND OF THE INVENTION

Magneto-optical recording media and devices for recording and reproducing information stored on magneto-optical recording media are generally known. A known magneto-optical recording medium is the magneto-optical disc, which is also denoted as MOD or MO and in which there is arranged behind a transparent layer a magneto-optical layer on which information or data are stored and from which the stored information or data can be read. In order to store or write information or data onto a magneto-optical disc, the magneto-optical layer is heated by a laser beam, focused onto the disc, to a temperature in the region of the Curie or compensation temperature. Arranged behind the disc is an electromagnet which magnetizes the region heated by the laser beam in one direction of magnetization or the other. A magneto-optical writing device therefore comprises an optical scanning device which co-operates with an electromagnet and is denoted as a pick-up. After the laser beam is switched off, the heated site cools off again below the compensation temperature, and the direction of magnetization fixed by the electromagnet is maintained. It is, so as to say, frozen. In this case, one direction of magnetization corresponds to a logic one while the opposite direction of magnetization represents a logic zero.

The information or data are read using a principle which is based on the Kerr effect and on the fact that the plane of polarization of a linearly polarized light beam is rotated by an angle in the case of reflection at a magnetized mirror. The plane of polarization of the reflected light beam is rotated to the right or left in accordance with the direction of magnetization of the mirror. The rotation of the plane of polarization of the light beam reflected by the disc is detected by an optical scanning device, and a corresponding information or data signal is generated.

Provided for the purpose of magnetizing the magneto-optical layer is an electromagnet which can magnetize a region which is swept over by an optical scanning device. Magneto-optical recording devices are known in which information or data already stored on the recording medium must be erased before new information or data can be recorded. For this purpose, the magneto-optical layer is heated by the laser up to the Curie or compensation temperature at the sites at which the new information or data are to be stored, and magnetized in one direction. The plate is initialized. The laser power is switched between a small and a large value as a function of the bit to be stored so as to record the new information or data. For example, if a logic zero is stored at the previously erased site, the laser operates at the low power so that the Curie or compensation temperature is not reached. For the purpose of recording a logic one, by contrast, the laser heats the new site to be written on up to the Curie or compensation temperature so that said site can be remagnetized.

By contrast with this, there are also already known magneto-optical recording devices in which already stored information or data are directly overwritten on the recording medium without firstly having to be erased. For the purpose of reliable remagnetization, this method presupposes a high field strength which must be changed over at high speed in order to record new information or data. Since changing over high field strengths at high speed leads in a known way to intense heating of the electromagnet, the data rate up to which this method can be applied is limited. A very high data rate such as required, for example, to store a television signal would lead to impermissible overheating of the write head. In order to store new information or data at a high data rate on a magneto-optical recording medium already written onto, it is therefore necessary for the stored information or data to be erased in advance in accordance with the above-named method. For this purpose, before recording it is necessary to provide a time consuming erasing pass, which can be carried out by the magneto-optical writing device provided for recording information or data. In order to permit information or data to be recorded immediately, there is therefore a need for an additional magneto-optical writing device which can then be used to erase in advance information or data already recorded on the magneto-optical recording medium. The magneto-optical recording medium is then initialized by the magneto-optical writing device, also denoted as an erase pick-up.

SUMMARY OF THE INVENTION

It is the object of the invention to create a magneto-optical recording or reproducing device which permits information or data recorded on a magneto-optical recording medium to be overwritten with information or data of a high data rate without a magneto-optical writing device for erasing recorded information or data, and which requires a low outlay.

This object is achieved by means of the features specified in the main claim. Advantageous embodiments and developments are specified in subclaims.

The invention proceeds from the finding that overwriting directly with a high data rate is rendered possible when there is arranged upstream of the magneto-optical writing device or upstream of the write head an erasing magnet which is, for example, a permanent magnet or electromagnet whose field strength is sufficient to initialize a region upstream of a track to be written without the assistance of a laser. It has been found that magneto-optical recording media can be initialized by a sufficiently strong magnetic field even without the assistance of a laser. This measure renders an erasing pass and an erase pick-up no longer necessary. Information or data already recorded on a magneto-optical disc are directly overwritten with the new information or data, which can also have a high data rate, without a previous erasing pass and a low outlay is required. Recording information or data onto the magneto-optical recording medium is then performed, for example, in a known way using a constant magnetic field and pulsed laser, and the erasing magnet has a magnetic field of opposite polarity to the magnet of the writing device.

With regard to the strength of its magnetic field, the erasing magnet is selected such that it erases the disc and/or the magneto-optical recording medium even without the assistance of a laser. In order, when returning to the start of the disc not to erase information or data already recorded and still to be reproduced in the case of a device for continuous recording, the erasing magnet is distanced from the disc, and thus deactivated, during the return, for example by means of an electromagnet or a mechanical device.

In the case of a magneto-optical recording and reproducing device for continuous recording and simultaneous or continuous reproduction of information or data, two optical scanning devices are then provided, of which one optical scanning device overwrites the magneto-optical recording medium in conjunction with a magnet, while the other respectively continuously reproduces. The use of the erasing magnet dispenses with an optical scanning device for erasing information or data before the recording of new information or data onto the magneto-optical recording medium. The outlay for such a device is thereby reduced.

Although the invention advantageously permits overwriting of information or data stored on magneto-optical recording media with information or data of a high data rate without a magneto-optical writing device for erasing recorded information, it is not, however, limited to recording or reproducing information or data with a high data rate.

BRIEF DESCRIPTION OF THE DRAWINGS

In an exemplary embodiment, the invention is explained in more detail with the aid of drawings, in which.

DETAILED DESCRIPTION OF THE PREFERRED EMBODIMENTS

Reference symbols are used uniformly in the Figures. For the purpose of simplification, it is only elements of a magneto-optical recording and reproducing device having an erasing facility for information or data recorded on a magneto-optical recording medium which are specified in the sketch of the principle, represented in FIG. 1. However, by omitting appropriate modules the device can also be designed as a magneto-optical reproducing device having an erasing facility or as a magneto-optical recording device having an erasing facility. The magneto-optical recording and reproducing device represented in FIG. 1 can advantageously be used both as a conventional recording and reproducing device and as a magneto-optical recording and reproducing device for continuous recording and reproduction. In accordance with this design, which can be used, for example, for monitoring purposes in banks or for time-shifted reproduction of television transmissions, a magneto-optical recording medium sectioned along its diameter is represented in perspective in FIG. 1. By means of a write head, which comprises a writing magnet SM and a first optical scanning device OPU1, information or data are written onto the magneto-optical recording medium inserted into the device. The writing magnet SM and the first optical scanning device OPU1 are arranged, in accordance with FIG. 1, in a fashion mechanically connected to one another and opposite one another, while the magneto-optical recording medium is located between them.

Figure 1:
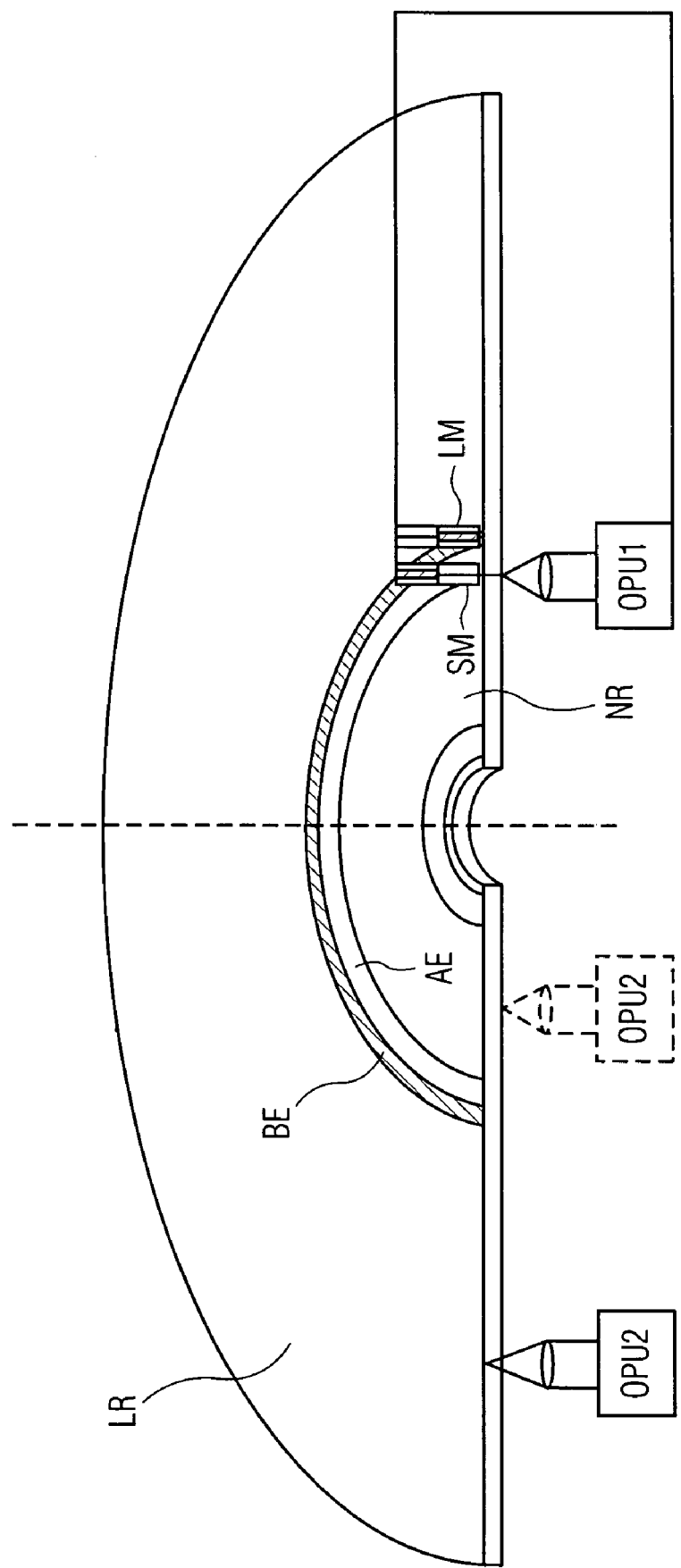
FIG. 1 shows a sketch of the principle of a magneto-optical recording and reproducing device having an erasing facility for information or data recorded on a magneto-optical recording medium.

Since recordings are made on magneto-optical recording media in a track from the inside to the outside, new information or data are recorded in a first region NR of the magneto-optical recording medium in accordance with FIG. 1. The write head is, for example, designed by analogy with known write heads. Also provided in accordance with FIG. 1 is an erasing facility which is formed in accordance with the invention exclusively by an erasing magnet LM and is arranged upstream of the write head in the scanning direction of the magneto-optical recording medium. The erasing magnet LM is used to initialise the magneto-optical recording medium directly before the recording of new information or data. The result is to produce on the magneto-optical recording medium upstream of the writing magnet SM a second region AE in which information or data previously stored on the magneto-optical recording medium are erased. The initialization of the magneto-optical recording medium before the recording of new information or data renders it possible, in particular, for regions of the magneto-optical recording medium already written on earlier to be recorded and/or overwritten with a high data rate such as is required, for example, to record video signals.

The erasing magnet LM is provided in FIG. 1 as a so-called permanent magnet which is arranged next to the writing magnet SM on the same side relative to the magneto-optical recording medium, and has a direction of magnetization opposite to the writing magnet SM. In addition, both the writing magnet SM and the erasing magnet LM can optionally also be designed as electromagnets. It is to be seen that the erasing facility consists only of an erasing magnet LM, and that no optical scanning device assigned to the erasing magnet LM is provided. No laser which heats the magneto-optical recording medium is provided for erasing stored information or data. In order, nevertheless, to achieve erasure of information or data already stored on a magneto-optical recording medium, and/or to initialize the magneto-optical recording medium, provision is made of an erasing magnet LM with a field strength sufficient to erase and/or initialize the magneto-optical recording medium. The field strength of the erasing magnet LM, which is greater by comparison with the field strength of the writing magnet SM, is used to erase information or data stored on the magneto-optical recording medium and to initialize the magneto-optical recording medium even without the assistance of a laser. This comparatively greater field strength of the erasing magnet LM leads, if appropriate, to the fact that, in accordance with the Figure, a plurality of tracks of the magneto-optical recording medium are simultaneously erased and/or initialized, thus producing on the magneto-optical recording medium a third region BE, which corresponds to a region currently erased and/or currently initialized. In particular in a device for the continuous recording or simultaneous reproduction of information or data, the simultaneous erasure of a plurality of tracks is insignificant, since the erasure region is small by comparison with the recording region and the progress of the erasure corresponds to that of the writing.

Figure 2:
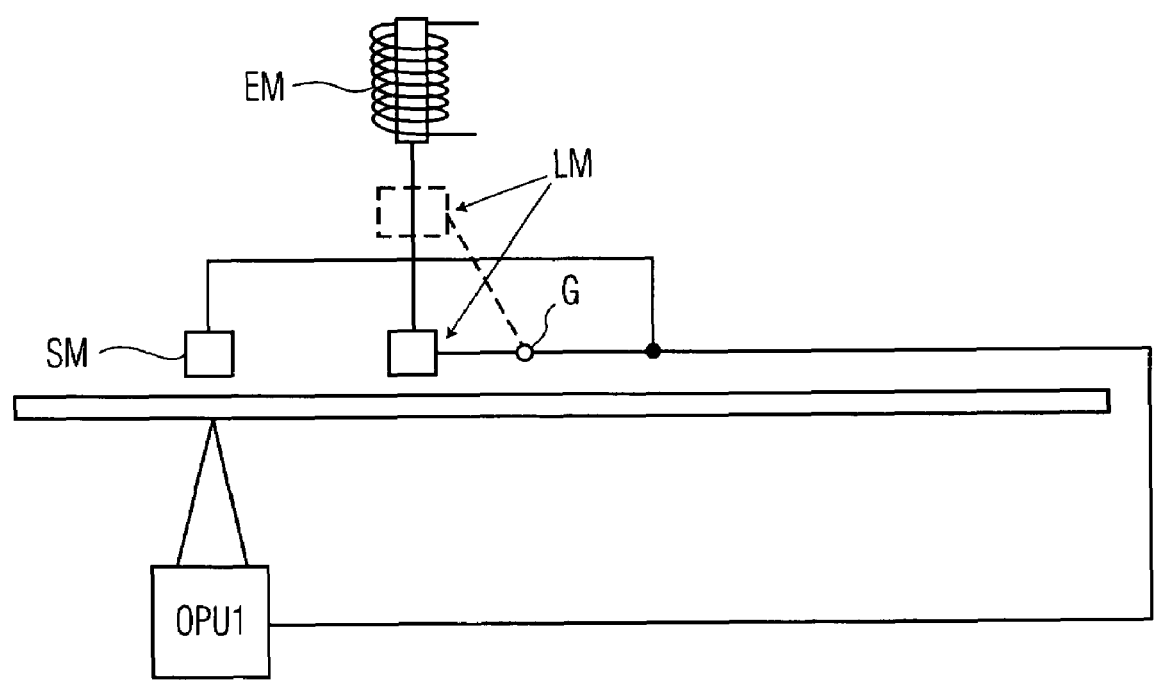
FIG. 2 shows a sketch of the principle of a magneto-optical recording device having means for distancing the erasing facility.

In accordance with FIG. 1, the erasing magnet LM is preferably mechanically connected to the write head, and is thereby guided over the magneto-optical recording medium in advance of the write head in the normal write or read direction of the magneto-optical recording medium. In the case of an optical scanning device OPU1 comprising coarse and fine drives, the mechanical connection between the writing magnet SM and the erasing magnet LM is provided in such a way that the writing magnet SM and the erasing magnet LM are connected to the coarse drive of the optical scanning device OPU1, or follow of the coarse drive. In an embodiment according to FIG. 1 which uses permanent magnets and laser modulation as the selected writing method, only slight requirements are placed on the quality and/or accuracy of the positioning and tracking of the writing magnet SM and the erasing magnet LM. It is sufficient to connect the writing magnet SM and erasing magnet LM to the optical scanning device OPU1 in a fashion corresponding to a metal or plastic angle which is produced with moderate precision. In an embodiment in accordance with FIG. 1, a means is to be provided for deactivating the erasing magnet LM, in order not to erase recorded information or data during a jump into the inner region of the magneto-optical recording medium. For this purpose, the connection between the erasing magnet LM and the writing device is, if appropriate, to be provided, in accordance with FIG. 2, via a joint G, and the erasing magnet LM is to be distanced from the magneto-optical recording medium for example by an electromagnet EM. For the purpose of continuous recording, the write head is displaced in a jump from the outer into the inner region of the magneto-optical recording medium. Deactivation of the writing magnet SM is not required if the field strength of the writing magnet SM is selected such that the magneto-optical recording medium is influenced only in co-operation with the laser of the optical scanning device OPU1.

A recording and reproducing device according to FIG. 1 for continuously recording and reproducing information or data has a second optical scanning device OPU2 for reading the recorded information or data. However, a second optical scanning device OPU2 is required only if, for example, it is intended to reproduce a radio or television transmission while simultaneously recording a radio or television transmission, in order to enable a time-shifted reproduction, for example. After the reproduction of information or data which are recorded, in accordance with FIG. 1, in a fourth region LR on the magneto-optical recording medium, the reading device and/or second optical scanning device OPU2 reaches the outer region of the magneto-optical recording medium. To continue the reproduction, the second optical scanning device OPU2 consequently jumps into the interior or first region NR of the magneto-optical recording medium, in which new information or data are recorded. In FIG. 1, this jump is specified by an optical scanning device OPU2 represented by dashed lines. In the case of a device for simultaneously recording and reproducing information or data, provision is then made of a first optical scanning device OPU1 for overwriting and a second optical scanning device OPU2 for reproduction, without the need for a third optical scanning device for erasing. The use of the permanent magnet for erasing renders superfluous the use of a third optical scanning device which would be used to carry out erasure before the recording.

However, the second optical scanning device OPU2, provided exclusively for reading the magneto-optical recording medium, and/or the reading device of the magneto-optical recording medium can also be used in a known way for optionally accessing information or data on the magneto-optical recording medium. A connection to a so-called live transmission is then achieved, for example, by jumping over recording regions. In the case of a reproducing device having an erasing facility, it is possible in accordance with a selected embodiment to provide a separate drive for the erasing magnet LM or the erasing magnet LM can be connected to the second opticel scanning device.

The invention claimed is:

1. Magneto-optical recording or reproducing device comprising
   an information erasing means, which erases information previously recorded for reproduction by the reproducing device, and, in the case of recording information, a writing device, formed from a writing magnet and an optical scanning device, for overwriting information or data recorded on a magneto-optical recording medium, wherein
   the information erasing means is formed by an erasing magnet moving with the optical scanning device and having a magnetic field which is directed opposite to the magnet of the writing device,
   the information erasing means is connected with the optical scanning device for moving with the optical scanning device to one of erase, and erase and initialize the magneto-optical recording medium only in a limited region moving with the optical scanning device upstream of a track to be written directly before the recording of new information or data and
   has a field strength sufficient
   to initialize the magneto-optical recording medium and
   to erase information previously stored in a recording layer on the magneto-optical recording medium facing the optical scanning device without the assistance of a laser
   for directly overwriting information or data recorded on a magneto-optical recording medium at high data rate
   without a magneto-optical writing device for erasing recorded information or data.

2. Magneto-optical recording or reproducing device according to claim 1, wherein the erasing magnet has a mechanical connection to the writing device.

3. Magneto-optical recording or reproducing device according to claim 1, wherein the erasing magnet has a mechanical connection to the writing device and the mechanical connection of the erasing magnet to the writing device is a joint.

4. Magneto-optical recording or reproducing device according to claim 1, wherein the erasing magnet is a permanent magnet.

5. Magneto-optical recording or reproducing device according to claim 1, wherein the erasing magnet is connected to a means for deactivating the erasing magnet.

6. Magneto-optical recording or reproducing device according to claim 1, wherein the erasing magnet is connected to a means for deactivating the erasing magnet and the means for deactivating the erasing magnet is an electromagnet.

7. Magneto-optical recording or reproducing device according to claim 1, wherein the erasing magnet is an electromagnet.

8. Magneto-optical recording or reproducing device comprising:
   an information erasing means, which erases information previously recorded for reproduction by the reproducing device and, in the case of recording information, a writing device, formed from a writing magnet and a first optical scanning device, for overwriting information or data recorded on a magneto-optical recording medium;
   an erasing magnet having a magnetic field which is directed opposite to the magnet of the writing device and having a field strength sufficient for initializing and erasing information previously stored in a recording layer on the magneto-optical recording medium facing the optical scanning device without the assistance of a laser
   for overwriting information or data recorded on a magneto-optical recording medium at high data rate without a magneto-optical writing device for erasing recorded information or data; and a second optical scanning device for reproducing information or data stored on the magneto-optical recording medium, the first and second optical scanning devices simultaneously recording and reproducing information or data and wherein the information erasing means is connected with the optical scanning device for moving with the optical scanning device to one of erase, and erase and initialize the magneto-optical recording medium only in a limited region moving with the optical scanning device upstream of a track to be written directly before the recording of new information or data.

\* \* \* \* \*